United States Patent
Jang

(10) Patent No.: US 9,193,379 B2
(45) Date of Patent: Nov. 24, 2015

(54) APPARATUS AND METHOD FOR STABILIZING STEERING FEEL IN MOTOR-DRIVEN POWER STEERING

(71) Applicant: HYUNDAI MOBIS CO., LTD., Seoul (KR)

(72) Inventor: Seok Hwan Jang, Suwon-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 46 days.

(21) Appl. No.: 14/089,576

(22) Filed: Nov. 25, 2013

(65) Prior Publication Data

US 2015/0066299 A1 Mar. 5, 2015

(30) Foreign Application Priority Data

Aug. 27, 2013 (KR) .................. 10-2013-0102010

(51) Int. Cl.
- *B62D 6/00* (2006.01)
- *B62D 5/04* (2006.01)
- *G06F 19/00* (2011.01)

(52) U.S. Cl.
CPC ............ *B62D 5/0472* (2013.01); *B62D 5/0463* (2013.01); *B62D 5/0466* (2013.01); *B62D 5/04* (2013.01); *G06F 19/00* (2013.01)

(58) Field of Classification Search
CPC ............ G06F 19/00; B62D 5/04; B62D 6/00; B62D 5/0466; B62D 5/0472; B62D 5/0463; A01B 69/00; A61B 5/165

See application file for complete search history.

(56) References Cited

U.S. PATENT DOCUMENTS

| | | | | |
|---|---|---|---|---|
| 5,238,079 A | * | 8/1993 | Gorim ......................... | 180/446 |
| 2004/0040778 A1 | * | 3/2004 | Katou et al. ................. | 180/402 |
| 2009/0125186 A1 | * | 5/2009 | Recker et al. ................. | 701/41 |
| 2010/0268418 A1 | * | 10/2010 | Fernandez et al. .............. | 701/41 |
| 2011/0153162 A1 | * | 6/2011 | Kezobo et al. ................. | 701/42 |

FOREIGN PATENT DOCUMENTS

| | | |
|---|---|---|
| JP | 2009-292413 A | 12/2009 |
| KR | 10-2012-0137087 A | 12/2012 |

* cited by examiner

*Primary Examiner* — Behrang Badii
(74) *Attorney, Agent, or Firm* — Knobbe Martens Olson & Bear LLP

(57) ABSTRACT

An apparatus for stabilizing a steering feel in a motor-driven power steering (MDPS) includes: an input unit configured to receive a column torque of a steering wheel; a calculation unit configured to convert the column torque signal inputted from the input unit into a target signal for generating a compensation signal of the steering wheel; and a compensation unit configured to calculate an assist torque for compensating for a main assist torque based on the target signal from the calculation unit.

9 Claims, 3 Drawing Sheets

APPARATUS AND METHOD FOR STABILIZING STEERING FEEL IN MOTOR-DRIVEN POWER STEERING

CROSS-REFERENCES TO RELATED APPLICATIONS

The present application claims priority to Korean application number 10-2013-0102010, filed on August 27, which is incorporated by reference in its entirety.

BACKGROUND OF THE INVENTION

The present invention relates to an apparatus and method for stabilizing a steering feel in a motor-driven power steering (MDPS), and more particularly, to an apparatus and method for stabilizing a steering feel in an MDPS, which receives a column torque of a steering wheel, filters noise components from the received column torque, and generates a compensation signal based on the column torque such that the steering wheel is stably returned.

A motor-driven power steering apparatus assists a steering force of a driver using torque of a motor, unlike an existing hydraulic power steering.

The motor-driven power steering apparatus is referred to as an MDPS or electronic power steering (EPS).

The MDPS receives a column torque from a torque sensor connected to a steering wheel, and calculates an assist amount of the motor by combining the received column torque with the speed of the vehicle, in order to improve steering performance.

The steering performance logic includes torque loop logic, high-frequency assist control (HFAC) logic, damping logic, and active returning logic. The torque loop logic is configured to set a main assist torque based on a booster output for a torque input. The HFAC logic is configured to reduce a sense of difference, felt by the driver due to the assist of the motor, and increase the output of the assist torque. The damping logic is configured to control vibration of the steering system. The active restoration logic is configured to increase the returning force of the steering wheel after rotation.

In particular, the damping logic serves to control the vibration of the steering system and stably control the returning speed when the steering wheel is restored.

However, the damping logic is subjected to a process of differentiating an input torque. During a rapid change, much glitch may occur, and the motor response speed of the MDPS may be decreased.

Furthermore, a phase margin may be significantly offset due to the differentiation process and a process of passing the input torque through a low pass filter. Thus, there is a limit to the magnitude and amount of noise which may be removed.

Thus, the MDPS in which various types of vibrations and noises may occur has a limitation in reducing the sense of difference felt by a driver.

The related art of the present invention is disclosed in Korean Patent Laid-open Publication No. 2012-0137087 published on Dec. 20, 2012 and entitled "System and method for controlling motor driven power steering".

SUMMARY OF THE INVENTION

Embodiments of the present invention are directed to an apparatus and method for stabilizing a steering feel in an MDPS, which is capable of improving an abnormal steering feel of a steering wheel in relation with performance logic of the MDPS, and reducing a sense of difference for a driver.

Embodiments of the present invention are directed to an apparatus and method for stabilizing a steering feel in an MDPS, which is capable of rapidly compensating for various high-frequency inputs and compensating various noises according to the characteristics of the noises.

In one embodiment, an apparatus for stabilizing a steering feel in an MDPS includes: an input unit configured to receive a column torque of a steering wheel; a calculation unit configured to convert the column torque signal inputted from the input unit into a target signal for generating a compensation signal of the steering wheel; and a compensation unit configured to calculate an assist torque for compensating for a main assist torque based on the target signal from the calculation unit.

The calculation unit may receive the column torque signal, removes noise from the received column torque signal, and convert the column torque signal from which the noise is removed into the target signal.

The calculation unit may include a high-pass filter.

The calculation unit may include a discretization section configured to discretize the column torque signal received from the input unit.

The discretization section may discretize the column torque based on a trapezoid rule.

The compensation unit may adjust a gain serving as an index of the compensation degree.

In another embodiment, a method for stabilizing a steering feel in an MDPS includes: receiving, by an input unit, a column torque of a steering wheel; converting, by a calculation unit, the column torque into a target signal; and calculating, by a compensation unit, an assist torque for compensating a main assist torque based on the target signal.

In the converting of the column torque into the target signal, the calculation unit may convert the column torque, from which noise is removed through a step of removing the noise of the received column torque, into the target signal.

The step of removing the noise of the received column torque may include passing the received column torque through a high-pass filter.

The converting of the column torque into the target signal may include discretizing the column torque according to a trapezoid rule.

In calculating the assist torque for compensating the main assist torque, the compensation unit may adjust a gain serving as an index of compensation degree.

DESCRIPTION OF SPECIFIC EMBODIMENTS

Embodiments of the invention will hereinafter be described in detail with reference to the accompanying drawings. It should be noted that the drawings are not to precise scale and may be exaggerated in thickness of lines or sizes of components for descriptive convenience and clarity only. Furthermore, the terms as used herein are defined by taking functions of the invention into account and can be changed according to the custom or intention of users or operators. Therefore, definition of the terms should be made according to the overall disclosures set forth herein.

Figure 1:
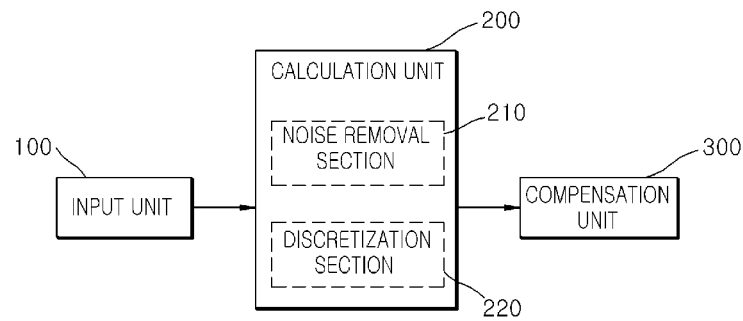
FIG. 1 is a block diagram of an apparatus for stabilizing a steering feel in a motor-driven power steering (MDPS).
Figure 2:
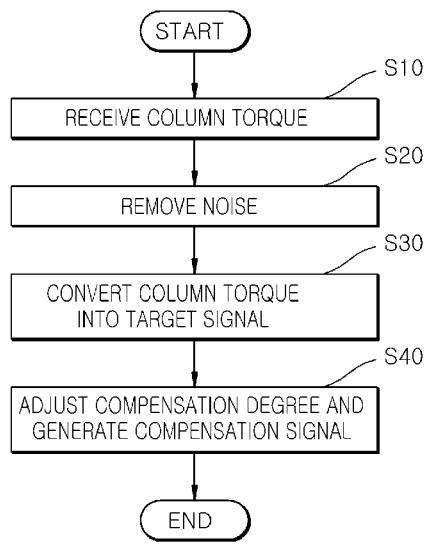
FIG. 2 is a flowchart illustrating a method for stabilizing a steering feel in an MDPS.

FIG. 1 is a block diagram of an apparatus for stabilizing a steering feel in a motor-driven power steering (MDPS). FIG. 2 is a flowchart illustrating a method for stabilizing a steering feel in an MDPS.

Figure 3:
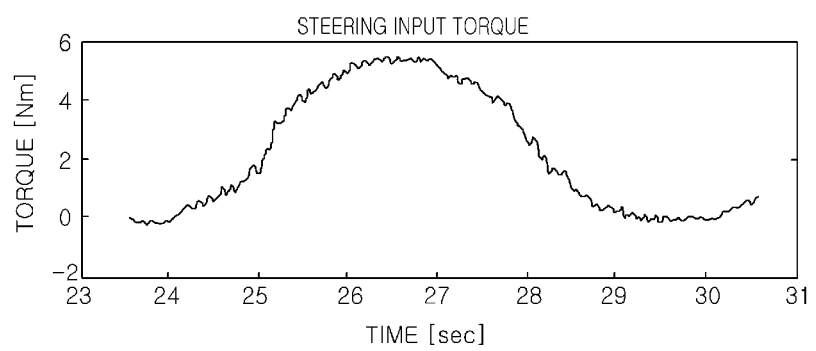
FIG. 3 is a graph illustrating torque occurring in a column when a steering wheel of a vehicle is steered.
Figure 4:
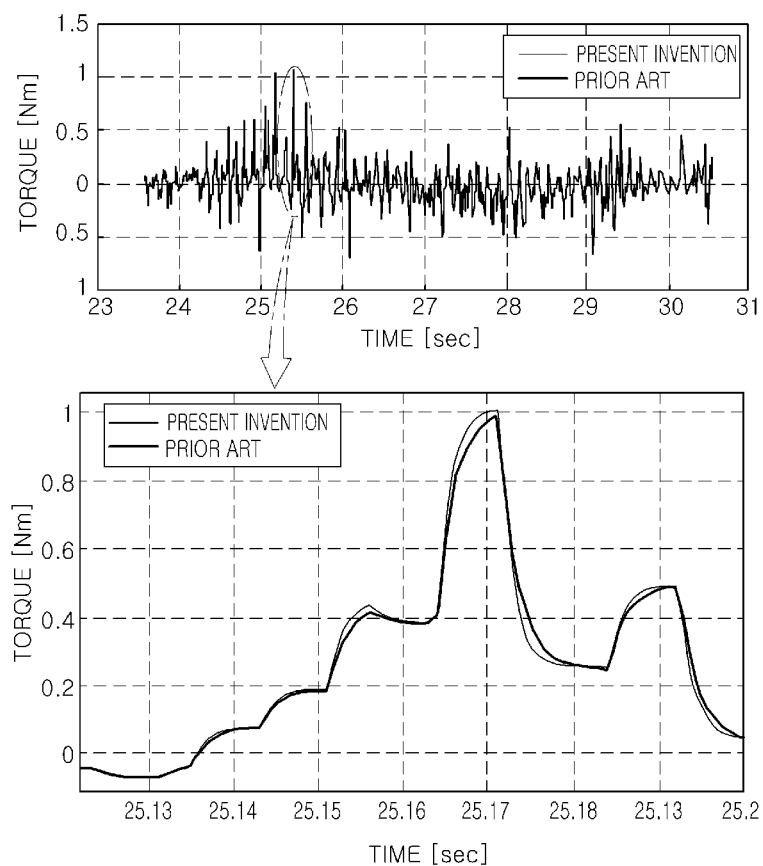
FIG. 4 is a graph illustrating comparison between a compensation signal of existing damping logic and a compensation signal in accordance with the embodiment of the present invention.

FIG. 3 is a graph illustrating torque occurring in a column when a steering wheel of a vehicle is steered. FIG. 4 is a graph illustrating comparison between a compensation signal of existing damping logic and a compensation signal in accordance with the embodiment of the present invention.

Referring to FIG. 1, the apparatus for stabilizing a steering feel in an MDPS in accordance with the embodiment of the present invention includes an input unit 100, a calculation unit 200, and a compensation unit 300.

The input unit 100 is configured to receive a column torque of a steering wheel of a vehicle.

The calculation unit 200 is configured to receive the column torque signal of the steering wheel of the vehicle from the input unit 100, remove noise from the received column torque signal, and convert the column torque signal from which noise is removed into a target signal for generating a compensation signal of the steering wheel.

An example of a transfer function of a filter which filters out noise is s/(s+a) where s represents the Laplace operator and a represents a cut-off frequency.

The target signal is obtained by filtering out unnecessary components such as noise from the column torque received by the input unit 100, and indicates a signal for determining an assist amount of a motor, which is generated to stabilize the steering feel of the MDPS.

Thus, when the target signal contains unnecessary noises or is generated through a complex process, the assist of the MDPS may be felt differently by a driver.

The noise components contained in the column torque of the steering wheel, inputted to the input unit 100, may include noise caused by an uneven ground surface, electron magnetic interference (EMI), noise of the torque sensor, or noise of an electronic element included in the MDPS.

The calculation unit 200 includes a noise removal section 210 and a discretization section 220.

The noise removal section 210 employs a method of removing noise through a high-pass filter, instead of using a differentiation process and a low pass filter which are generally used for filtering out the above-described noises.

Thus, since the noise removal section does not require a differentiation process, delay caused by the differentiation process does not occur, but glitch may be reduced even when the column torque signal is rapidly changed.

The discretization section 220 serves to discretize successive signals.

The discretization refers to an approximation method which expresses successive physical parameters as a finite number of variables, and may include a finite element method, a finite differential method and the like.

In the present embodiment, the discretization refers to a digitalization process of converting a column torque value corresponding to successive physical parameters into a column torque signal and expressing the column torque signal by 0 and 1 such that the compensation unit 300 may calculate the assist torque, and a signal to be discretized by the discretization section 220 may include the signal from which noise is removed through the noise removal section 210.

In general, the backward-rectangular rule is used as a method for discretizing an input column torque signal in an MDPS. However, the discretization section 220 may use the trapezoid rule or Tustin rule based on trapezoid integration as well as the forward-rectangular rule.

The trapezoid rule is a discretization method based on trapezoid integration, and uses a quadrature rule which approximately calculates a function according to primary interpolation (straight line connecting adjacent points) during numerical integration. Since an integration target is calculated through the area of a trapezoid rectangle, the discretization method is referred to as the trapezoid rule.

Furthermore, the trapezoid rule is characterized in that discrete regions are stable when continuous regions are stable. Thus, when the trapezoid rule is used as the discretization method of the discretization section 220, the discretization section 220 may secure a more sufficient margin for the steering feel stabilization logic than the existing backward-rectangular rule, guarantee the stability of steering, and rapidly compensate for various inputs.

The compensation unit 300 receives the target signal extracted through the calculation unit 200, and calculates an assist torque for compensating for a main assist torque based on the target signal. Then, the compensation unit 300 adds the calculated assist torque to the main assist torque.

The compensation unit 300 converts the calculated assist torque into the form of a compensation signal, and transfers the compensation signal to the MDPS.

Thus, since the assist torque is calculated on the basis of the target signal obtained by filtering out various noises and vibrations, a more favorable operation may be performed to stabilize the steering feel of the MDPS.

The process of calculating the assist torque of the MDPS and adding the calculated assist torque to the main assist torque so as to optimize the motor rotation of the MDPS is well known to those skilled in the art. Thus, the detailed descriptions thereof are omitted herein.

The compensation unit 300 may adjust a gain serving as an index of the compensation degree. Thus, the compensation unit 300 may calculate the assist torque by applying an optimal gain to optimize the compensation according to the state of a road, a driving habit of a driver, fuel consumption or the like.

Referring to FIGS. 3 and 4, the difference between the present invention and the conventional method will be described. As illustrated in FIG. 3, when a driver steers a steering wheel, a torque occurs in the column. In particular, an upper graph of FIG. 4 illustrates a torque occurring in the column when the steering wheel is steered at a low speed of 0.5 RPS (Revolutions Per Second) or less, and low-frequency and high-frequency components are mixed in the torque.

Furthermore, referring to a lower graph of FIG. 4, a thick solid line indicates compensation torque by the conventional steering feel stabilization logic, and a thin solid line indicates compensation torque by the steering feel stabilization logic in accordance with the embodiment of the present invention.

Referring to FIG. 4, it can be seen that the compensation torque of the steering feel stabilization logic in accordance with the embodiment of the present invention leads the compensation torque of the conventional steering feel stabilization logic, and has a larger torque value or smaller torque value within the same time range.

As such, the steering feel stabilization logic in accordance with the embodiment of the present invention may respond to the same input at higher speed than the conventional steering feel stabilization logic and may have a larger variation than the conventional steering feel stabilization logic.

Thus, a driver cannot feel vibrations occurring above a torsion bar of the MDPS, and may feel the ground surface more clearly. Furthermore, since the steering feel stabilization logic in accordance with the embodiment of the present invention has a more sufficient margin than the conventional steering feel stabilization logic, the steering feel stabilization logic in accordance with the embodiment of the present invention may rapidly compensate for various high-frequency inputs. Furthermore, since the steering feel stabilization logic in accordance with the embodiment of the present invention compensates for various noises such as booming vibration and ripple vibration according to the characteristics of the noises, the degree of freedom for the compensation may be improved.

Hereafter, a method for stabilizing a steering feel in an MDPS will be described with reference to FIG. 2.

When the input unit 100 receives a column torque of the steering wheel at step S10, the input unit 100 transfers the received column torque to the calculation unit 200.

The calculation unit 200 removes noise of the received column torque at step S20, and converts the column torque from which the noise is removed into a target signal at step S30.

The step of removing the noise of the received column torque includes passing the column torque through a high-pass filter, and the step of converting the column torque from which noise is removed into the target signal includes discretizing the column torque based on the trapezoid rule. This has been already described above when the apparatus for stabilizing a steering feel in an MDPS is described.

The calculation unit 200 transfers the target signal to the compensation unit 300, and the compensation unit 300 calculates an assist torque for compensating for a main assist torque based on the received target torque. Furthermore, the compensation unit 300 adjusts a compensation degree based on the calculated assist torque, and generates a compensation signal at step S40. The step of adjusting the compensation degree based on the target signal and generating the compensation signal may include adjusting a gain serving as an index of the compensation degree. This has been already described when the apparatus for stabilizing a steering feel in an MDPS is described.

As such, the apparatus and method for stabilizing a steering feel in accordance with the embodiment of the present invention generates a torque of the motor in consideration of the speed of a vehicle, a booster output for an input torque, and a returning force. Thus, a driver may have a more stable steering feel than the conventional steering feel stabilization logic, and may reduce a sense of difference caused by various vibrations and noises. Furthermore, delay occurring during a differentiation process may be reduced, and the problem that signals are not distinguished may be solved. Thus, response may be performed simply at high speed. Furthermore, the steering feel stabilization logic in accordance with the embodiment of the present invention may secure a more sufficient margin than the existing steering feel stabilization logic. Thus, the apparatus and method for stabilizing a steering feel in accordance with the embodiment of the present invention may rapidly compensate for various high-frequency inputs, and compensate for various noises according to the characteristics of the noises.

The embodiments of the present invention have been disclosed above for illustrative purposes. Those skilled in the art will appreciate that various modifications, additions and substitutions are possible, without departing from the scope and spirit of the invention as disclosed in the accompanying claims.

What is claimed is:

1. An apparatus for a motor-driven power steering (MDPS), the apparatus comprising:
    a main assist toque logic configured to provide a main assist torque signal based on a column torque signal indicative of torque applied to a steering wheel;
    a compensation assist torque logic comprising a high-pass filter and configured to generate a compensation assist torque signal, wherein in the compensation assist torque logic, the column torque signal is applied to the high-pass filter to remove low frequency components in the column torque signal, wherein the compensation assist torque logic does not comprise a low-pass filter; and
    a control logic configured to combine the main assist torque signal and the compensation assist torque signal for compensating the main assist torque signal to control a steering motor of the motor driven power steering.

2. The apparatus of claim 1, wherein the compensation assist torque logic does not comprise a differentiator and is configured to generate the compensation assist torque signal without differentiating a signal therein.

3. The apparatus of claim 1, wherein the compensation assist torque logic comprises a discretizer configured to discretize the column torque signal.

4. The apparatus of claim 3, wherein the discretizer is configured to discretize the column torque signal based on a trapezoid rule.

5. The apparatus of claim 1, wherein the compensation assist torque logic is configured to adjust a gain serving as an index of compensation degree.

6. A method of processing signals for a motor-driven power steering (MDPS), the method comprising:
    providing a main assist torque signal based on a column torque signal indicative of column torque applied to of a steering wheel;
    processing the column torque signal to provide a compensation assist torque signal in a compensation assist torque logic, in which the column torque signal is applied to a high-pass filter to remove low frequency components in the column torque signal, wherein processing the column torque signal does not involve applying a signal to a low-pass filter;
    combining the main assist torque signal and the compensation assist torque signal for compensating the main assist torque signal to control a steering motor of the motor driven power steering.

7. The method of claim 6, wherein processing the column torque signal does not involve differentiating a signal.

8. The method of claim 6, wherein processing the column torque signal further comprises discretizing the column torque according to a trapezoid rule.

9. The method of claim 6, wherein processing the column torque signal further comprises adjusting a gain serving as an index of compensation degree.

* * * * *